US011560650B2

(12) United States Patent
Lefebvre et al.

(10) Patent No.: US 11,560,650 B2
(45) Date of Patent: Jan. 24, 2023

(54) FIBER STRUCTURE AND A COMPOSITE MATERIAL PART INCORPORATING SUCH A STRUCTURE

(71) Applicants: SAFRAN CERAMICS, Le Haillan (FR); ALBANY INTERNATIONAL CORP., Rochester, NH (US)

(72) Inventors: Marie Lefebvre, Moissy-Cramayel (FR); François Charleux, Bordeaux (FR); Dominique Coupe, Moissy-Cramayel (FR); Brock Gilbertson, Dover, NH (US); Julie-Anne Bouchet, Lee, NH (US)

(73) Assignees: SAFRAN CERAMICS, Le Haillan (FR); ALBANY INTERNATIONAL CORP., Rochester, NH (US)

( * ) Notice: Subject to any disclaimer, the term of this patent is extended or adjusted under 35 U.S.C. 154(b) by 168 days.

(21) Appl. No.: 17/221,439

(22) Filed: Apr. 2, 2021

(65) Prior Publication Data

US 2021/0238778 A1    Aug. 5, 2021

Related U.S. Application Data

(62) Division of application No. 16/763,900, filed as application No. PCT/FR2018/052803 on Nov. 9, 2018, now Pat. No. 10,995,431.

(Continued)

(30) Foreign Application Priority Data

Jun. 25, 2018 (FR) ...................................... 1855627

(51) Int. Cl.
*D03D 25/00* (2006.01)
*B29C 70/24* (2006.01)
(Continued)

(52) U.S. Cl.
CPC ............ *D03D 25/005* (2013.01); *B29C 70/24* (2013.01); *B29C 70/48* (2013.01); *B29K 2063/00* (2013.01);
(Continued)

(58) Field of Classification Search
CPC .............................. D03D 25/005; B29C 70/24
See application file for complete search history.

(56) References Cited

U.S. PATENT DOCUMENTS 5,279,892 A    1/1994  Baldwin
7,101,154 B2   9/2006  Dambrine et al.
(Continued)

FOREIGN PATENT DOCUMENTS

CN    101473079 A    7/2009
CN    101775683 A    7/2010
(Continued)

OTHER PUBLICATIONS

First Office Action as issued in Chinese Patent Application No. 201880072931.9, dated Feb. 10, 2021.
(Continued)

*Primary Examiner* — Andrew T Piziali
(74) *Attorney, Agent, or Firm* — Pillsbury Winthrop Shaw Pittman LLP

(57) ABSTRACT

A method of fabricating a fiber structure by multilayer three-dimensional weaving between a plurality of weft yarns and of warp yarns, the fiber structure having at least first and second portions that are adjacent in the warp direction, the first portion presenting, in a direction perpendicular to the warp and weft directions, a thickness greater than the thickness of the second portion, includes making the first portion using a step of three-dimensionally weaving warp and weft layers in which a fiber fabric is formed in the form of a Mock-Leno weave grid in a core of the first portion (Continued)

together with skins at a surface of the first portion, a weave of the skins being modified locally so as to deflect certain warp yarns from said skins and weave them with the fiber fabric in the form of the Mock-Leno weave grid.

5 Claims, 11 Drawing Sheets

Related U.S. Application Data

(60) Provisional application No. 62/585,953, filed on Nov. 14, 2017.

(51) Int. Cl.
| | |
|---|---|
| *B29C 70/48* | (2006.01) |
| *B29K 63/00* | (2006.01) |
| *B29K 105/08* | (2006.01) |
| *B29K 307/04* | (2006.01) |
| *B29K 309/02* | (2006.01) |
| *B29L 31/08* | (2006.01) |

(52) U.S. Cl.
CPC .. *B29K 2105/0845* (2013.01); *B29K 2307/04* (2013.01); *B29K 2309/02* (2013.01); *B29L 2031/082* (2013.01); *D10B 2101/08* (2013.01); *D10B 2101/12* (2013.01)

(56) References Cited

U.S. PATENT DOCUMENTS

| 7,241,112 B2 | 7/2007 | Dambrine et al. |
|---|---|---|
| 2006/0257260 A1 | 11/2006 | Dambrine et al. |
| 2010/0167007 A1 | 7/2010 | Goering |
| 2010/0254821 A1 | 10/2010 | Parkin |
| 2011/0038732 A1 | 2/2011 | Huth |
| 2011/0052405 A1 | 3/2011 | Parkin |
| 2011/0176927 A1 | 7/2011 | Alexander |
| 2011/0311368 A1 | 12/2011 | Coupe et al. |
| 2012/0051935 A1 | 3/2012 | Naik |
| 2013/0272893 A1 | 10/2013 | Fabre et al. |
| 2014/0322485 A1 | 10/2014 | Marchal |
| 2014/0334935 A1 | 11/2014 | Dambrine et al. |
| 2014/0369848 A1 | 12/2014 | Marchal |
| 2016/0101591 A1 | 4/2016 | Khan |
| 2016/0244897 A1 | 8/2016 | Gimat et al. |
| 2017/0101730 A1 | 4/2017 | Gilbertson |
| 2018/0038021 A1 | 2/2018 | Lefebvre et al. |

FOREIGN PATENT DOCUMENTS

| CN | 107250450 A | 10/2017 |
|---|---|---|
| JP | 2005-133717 A | 5/2005 |
| JP | 2012-514140 A | 6/2012 |
| JP | 2013-533158 A | 8/2013 |
| JP | 2015-504980 A | 2/2015 |
| JP | 2016-533437 A | 10/2016 |
| JP | 2018-532900 A | 11/2018 |
| RU | 2 518 622 C2 | 6/2014 |
| WO | WO 2010/061140 A1 | 6/2010 |
| WO | WO 2017/066259 A1 | 4/2017 |

OTHER PUBLICATIONS

International Preliminary Report on Patentability and the Written Opinion of the International Searching Authority as issued in International Patent Application No. PCT/FR2018/052803, dated May 19, 2020.
International Search Report as issued in International Patent Application No. PCT/FR2018/052803, dated Jan. 28, 2019.

FIBER STRUCTURE AND A COMPOSITE MATERIAL PART INCORPORATING SUCH A STRUCTURE

CROSS-REFERENCE TO RELATED APPLICATIONS

This application is a divisional of application Ser. No. 16/763,900 filed May 13, 2020, which is the U.S. National Stage of PCT/FR2018/052803, filed Nov. 9, 2018, which in turn claims priority to U.S. patent application No. 62/585,953 filed Nov. 14, 2017 and French patent application number 1855627 filed Jun. 25, 2018. The content of these applications are incorporated herein by reference in their entireties.

BACKGROUND

The present invention relates to making parts out of composite material, and more particularly to making fiber reinforcing structures for such parts by three-dimensional (3D) or multilayer weaving.

A field of application of the invention is making parts out of structural composite material, i.e. parts having a fiber reinforcing structure densified by a matrix. Composite materials enable parts to be made having overall weight that is lower than that of the same parts when they are made out of a metal material.

The invention relates more particularly to parts made out of composite material that include one or more portions of local extra thickness, as applies for example to the root of an aeroengine blade, which corresponds to a zone having great variation of thickness in the composite material part. For a part made out of composite material that presents varying thickness, the change of thickness is controlled in the fiber structure that is to constitute the reinforcement of the part.

Making blades out of composite material for turbine engines has already been proposed. Reference may be made in particular to patent application US 2011/0311368 filed jointly by Snecma and Snecma Propulsion Solide. That application describes fabricating a turbine engine blade out of composite material comprising fiber reinforcement densified by a matrix, the fiber blank that is to constitute the reinforcement is made by multilayer weaving and comprises a first portion of small thickness forming the airfoil preform and a second portion of greater thickness forming a blade root preform. Under such circumstances, the blade root preform is made using an insert so as to form a bulb-shaped region in the portion of the blade corresponding to its root.

Nevertheless, that technique for forming the blade root makes industrial fabrication of the blade more complex and increases its fabrication cost since it leads to large losses of material and requires difficult handling that slows down the speed of production. In addition, the insert, which is also made of composite material, needs to be densified and machined, thereby leading to additional costs and possibly to parts being rejected.

The textile of the preform, which is naturally floppy, interacts mechanically with the insert and can lead in particular to shear in the textile, to turning movements of the insert, to loss of interlinking between the insert of the textile, etc.

Furthermore, molding and densifying the portion of the preform that is to form the blade root are found to be difficult, in particular because the tolerances for the profile of the bulb-shaped root are very small (of the order of one-tenth of a millimeter) and because this portion of the blade presents severe requirements in terms of mechanical properties, given that the blade root concentrates the majority of the forces that are applied to the blade.

Another solution, as described in particular in Documents U.S. Pat. No. 7,101,154 and US 2011/0311368 consists in increasing the weight (and thus the cross-section) of the yarns in the portions of greater thickness in the fiber structure in order to reduce the capacity for decreasing thickness while the 3D fiber structure is being shaped with compression. Nevertheless, the use of yarns of high weight locally increases the fiber fraction in the preform. If the fiber fraction is too great, the resulting network of pores may not be sufficient for enabling the components of the matrix to have good access to the core of the preform and consequently for obtaining a composite material that is uniform and thus presents good mechanical properties.

It is therefore desirable to be able to have available 3D or multilayer fiber structures including portions of greater thickness, but that do not present the above-mentioned drawbacks.

SUMMARY

To this end, in a first aspect, the invention provides a fiber structure comprising a plurality of weft layers and of warp layers interlinked by multilayer three-dimensional weaving, the fiber structure having at least first and second portions that are adjacent in the warp direction, the first portion presenting, in a direction perpendicular to the warp and weft directions, a thickness that is greater than the thickness of the second portion, the structure being characterized in that the first portion has at its core at least one fiber fabric obtained by three-dimensional weaving of warp yarns and weft yarns in the form of a Mock-Leno weave grid, said at least one fabric being present between two skins present at the surface of the first portion and being linked to the skins by warp yarns belonging to said skins that are locally deflected into said fabric.

Using the Mock-Leno weave fiber fabric in the core of the fiber structure makes it possible to obtain great variation of thickness between the first and second portions while controlling the fiber fraction in the core of the first portion. In addition, this Mock-Leno weave fabric enables the ingredients of the matrix to infiltrate the fiber structure to the core very well because of its openwork structure in the form of a grid, and it is compatible with the use of strands of high weight. The fiber structure of the invention is entirely textile (i.e. without any added insert) and the yarns of the structure are interlinked by 3D or multilayer weaving, thus making it possible to ensure that the structure cannot be delaminated.

A Mock-Leno weave fabric comprises a plurality of weft layers and is characterized by the fact that it is formed by weaving a plurality of warp yarns with a plurality of weft yarns and by the fact that it comprises at least:

a first group of warp yarns comprising at least one inter-layer linking warp yarn linking the weft yarns of a first layer of the fabric to the weft yarns of a second layer of the fabric that is adjacent to the first layer; and a second group of warp yarns, distinct from the first group of warp yarns and adjacent thereto in the weft direction, said second group comprising at least one inter-layer linking warp yarn linking the weft yarns of the first layer to the weft yarns of the second layer and presenting an interlinking direction with the weft yarns that is inverted relative to the interlinking direction presented by the inter-layer linking warp yarn of the first group with the weft yarns.

Throughout this text and in all of the drawings, it is stated and shown by convention and for reasons of convenience, that it is the warp yarns that are deflected from their paths in order to take hold of weft yarns. Nevertheless, these roles between warp and weft can be inverted, and such an inversion should be considered as also being covered by the claims.

The fact that the inter-layer linking warp yarns in each of the first and second groups are interlinked with the weft yarns in inverted interlinking directions makes it possible to avoid these two linking yarns coming into contact. This characteristic makes it possible to conserve non-zero spacing along the weft direction between the first and second groups of warp yarns, thereby imparting a grid shape to the fabric presenting channels formed through its thickness, each of these channels being defined in the weft direction by two adjacent groups of warp yarns and in the warp direction by two adjacent groups of weft yarns. The presence of these channels makes it possible to give the Mock-Leno fabric an openwork structure, thus serving in particular to enable the ingredients of the matrix to infiltrate well to the core.

Preferably, each of the first and second groups of warp yarns comprises at least two lateral warp yarns situated on either side of the inter-layer linking warp yarn, each of these lateral warp yarns interlinking with the weft yarns of the first layer.

Also preferably, the lateral warp yarns of the first group present an interlinking direction with the weft yarns that is inverted relative to the interlinking direction presented by the lateral warp yarns of the second group with the weft yarns.

In an embodiment, the Mock-Leno weave fiber fabric presents, in a direction perpendicular to the warp and weft directions, a thickness that decreases going towards the second portion.

Such a characteristic is advantageous in order to control the shape of the first portion and ensure the thickness transition with the second portion.

In an embodiment, the first and second portions have the same number of warp yarns woven continuously between said first and second portions, and the first portion includes in its core a number of warp yarn layers that is greater than the number of warp yarn layers present in the core of the second portion.

By subdividing the layers of warp yarns in the core of the first portion (i.e. by varying their count), it is possible to control the fiber fraction in the core of the first portion while maintaining a satisfactory warp/weft ratio in the skin over the entire fiber structure. By way of example, the first portion may include in its core a number of warp yarn layers that is equal to twice the number of warp yarn layers present in the core of the second portion.

In an embodiment, the structure comprises carbon yarns or ceramic material yarns. The ceramic material of the yarns may for example be an oxide material such as alumina, or a non-oxide material, such as silicon carbide.

The present invention also provides a composite material part comprising fiber reinforcement densified by a matrix, said fiber reinforcement being constituted by a fiber structure as described above.

In an embodiment, the part corresponds to a turbine blade, the first portion of the fiber structure constituting the blade root portion of the fiber reinforcement.

The present invention also provides a method of fabricating a fiber structure by multilayer three-dimensional weaving between a plurality of weft yarns and of warp yarns, the fiber structure having at least first and second portions that are adjacent in the warp direction, the first portion presenting, in a direction perpendicular to the warp and weft directions, a thickness greater than the thickness of the second portion, the method being characterized in that the first portion is made by means of a step of three-dimensionally weaving warp and weft layers in which a fiber fabric is formed in the form of a Mock-Leno weave grid in the core of the first portion together with skins at the surface of the first portion, the weave of the skins being modified locally so as to deflect certain warp yarns from said skins and weave them with the Mock-Leno weave fabric.

In an implementation of such a method, the Mock-Leno weave fabric presents, in a direction perpendicular to the warp and weft directions, a thickness that decreases going towards the second portion.

In an implementation of such a method, the first and second portions have the same number of warp yarns woven continuously between the first and second portions, and the first portion comprises in its core a number of warp yarn layers that is greater than the number of warp yarn layers present in the core of the second portion.

In an implementation of such a method, the first portion comprises in its core a number of warp yarn layers equal to twice the number of warp yarn layers present in the core of the second portion.

In an implementation of such a method, the fiber structure comprises carbon yarns or ceramic material yarns. The ceramic material of the yarns may for example be an oxide material, such as alumina, or a non-oxide material, such as silicon carbide.

BRIEF DESCRIPTION OF THE DRAWINGS

Other characteristics and advantages of the invention appear from the following description of particular embodiments of the invention given as non-limiting examples and described with reference to the accompanying drawings, in which.

DETAILED DESCRIPTION

Figure 1:
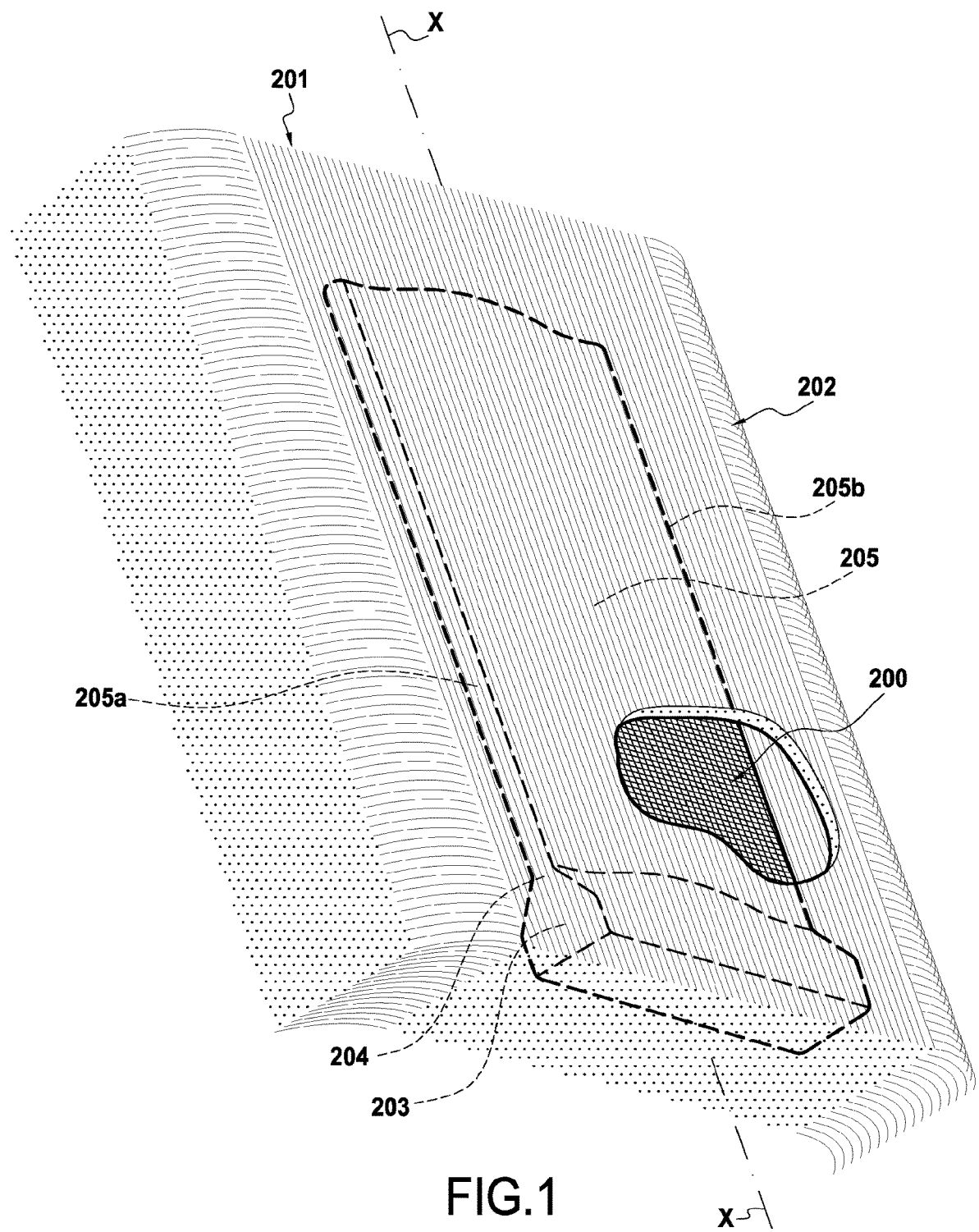
FIG. 1 is a diagrammatic view showing the multilayer weaving of a fiber structure for fabricating an aeroengine blade in an embodiment of the invention.

The invention applies in general manner to making fiber structures suitable for constituting the fiber reinforcement or preform for use in fabricating a composite material part, in particular an aeroengine blade, the part being obtained by densifying the fiber structure with a matrix. For composite materials that are used at relatively low temperature, typically up to 300° C., the matrix is typically a resin or else a refractory material such as carbon or ceramic, e.g. silicon carbide, when making composites that are thermostructural.

The fiber structure of the invention is obtained by three-dimensional weaving or multilayer weaving.

The term "three-dimensional weaving" or "3D weaving", is used herein to mean weaving in which at least some of the warp yarns interlink weft yarns over a plurality of weft layers.

The term "multilayer weaving" is used herein to designate 3D weaving with a plurality of weft layers in which the base weave for each layer is equivalent to a conventional 2D fabric weave, such as a weave of plain, satin, or twill type, but with certain points of the weave linking the weft layers together.

Making the fiber structure by 3D or multilayer weaving makes it possible to obtain linking between the layers and thus to have good mechanical behavior for the fiber structure and for the resulting composite material part, while performing a single textile operation.

It is important to enhance obtaining a surface state, after densification, that is free from major irregularities, i.e. that has a good state of finish in order to avoid or limit finishing operations by machining or to avoid forming lumps of resin in resin matrix composites. For this purpose, for a fiber structure having an internal portion or core and an external portion or skin adjacent to the outside surface of the fiber structure, the skin is preferably made by weaving with a plain, satin, or twill type weave in order to limit surface irregularities, with a satin type weave also providing a surface appearance that is smooth. The weave at the skin can be varied at the outside surface of the fiber structure so as to impart desired particular properties, e.g. by passing from a plain type weave that gives preference to tight bonding to a satin type weave that gives preference to a smooth surface state.

In accordance with the invention, in order to form a portion of large thickness in the fiber structure while controlling the fiber fraction in that portion, a Mock-Leno type fiber fabric is used for weaving the core of the fiber structure. It is also possible to use yarns or strands of different weights between the core and the skin and/or between warp and weft in order to obtain a ratio within desired limits between the warp fiber volume fraction and the weft fiber volume fraction.

In order to obtain mechanical properties that are as little non-uniform as possible within the composite material part, it is also advantageous to enhance densification of the reinforcing fiber structure with a densification gradient that is as small as possible between the core of the fiber structure and its skin, in particular when performing densification by chemical vapor infiltration (CVI). For this purpose, in order to enhance access to the core of the preform, the core is woven with a Mock-Leno type weave that provides easy communication for the ingredients of the matrix because of its openwork grid shape.

It may be desirable to cause the weight, i.e. the cross-section, of the yarns or strands used for weaving the fiber structure to vary, in particular by using yarns or strands of different weights between the core and the skin and/or between warp and weft. Decreasing weight between the core and the skin facilitates access to the core for gas passing through the skin when performing CVI densification. The weights may also be selected so to obtain a ratio within desired limits between the warp fiber volume fraction and the weft fiber volume fraction.

In an example, it is possible to use braids for forming all or part of the core of the fiber structure and to use yarns or strands of smaller thickness than the braids in the skin of the fiber structure. Such an example makes it possible to further increase the thickness of the fiber structure while controlling the mean fiber fraction.

It may also be desirable to use yarns of different chemical natures between the various portions of the fiber structure, in particular between the core and the skin, in order to impart particular properties to the resulting composite material part, in particular in terms of ability to withstand oxidation or wear.

An embodiment of a fiber structure in accordance with the invention is described below. In this embodiment, the weaving is performed on a Jacquard type loom.

FIG. 1 is a highly diagrammatic view of a fiber structure 200 that is to form the fiber reinforcement of an aeroengine blade.

The fiber structure 200 is obtained by three-dimensional weaving (or "3D weaving"), or by multilayer weaving, performed in known manner using a Jacquard type loom having a bundle of warp yarns or strands 201 in a plurality of layers, the warp yarns linking together weft yarns 202 also arranged in a plurality of layers. A detailed embodiment of a fiber preform that is to form the fiber reinforcement of a blade for an aeroengine is described in particular in the following documents: U.S. Pat. Nos. 7,101,154; 7,241,112; and WO 2010/061140.

The fiber structure 200 is woven in the form of a strip extending in general manner in a direction X corresponding to the longitudinal direction of the blade that is to be made. The fiber structure presents thickness that varies, and that is determined as a function of the longitudinal thickness and of the profile of the airfoil of the blade that is to be made. In its portion that is to form a root preform, the fiber structure 200 presents a portion 203 of greater thickness that is determined as a function of the thickness of the root of the blade that is to be made. The fiber structure 200 extends over a portion 204 of decreasing thickness that is to form the tang of the blade, followed by a portion 205 that is to form the airfoil of the blade. In a direction perpendicular to the direction X, the portion 205 presents a profile that is of varying thickness between its edge 205a that is to form the leading edge of the blade and its edge 205b that is to form the trailing edge of the blade that is to be made.

The fiber structure 200 is woven as a single piece and, after cutting away non-woven yarns, it needs to present almost the final shape and dimensions of the blade (i.e. its "net" shape). To this end, in portions where the thickness of the fiber structure varies, as in the portion 204 of decreasing thickness, the reduction in the thickness of the preform is obtained by progressively withdrawing weft layers while weaving.

In this example, the same number of warp yarns is used in the portion 203 of greater thickness as in the portion 204 of decreasing thickness. For this purpose, the layers of warp yarns present in the core of the portion 203 of greater thickness are splayed apart so as to obtain a greater number of warp yarn layers in the portion 203 of greater thickness than in the portion 204 of decreasing thickness. The layers of warp yarns present in the core of the portion 203 of greater thickness then present smaller count than the layers of warp yarns present in the portion 204 of decreasing thickness. The term "count" is used here to designate the number of yarns per unit length in the warp direction and in the weft direction.

FIGS. 2 to 17 show a portion of sixteen successive planes of a weave in the portion 203 of greater thickness in the fiber structure 200 obtained by 3D weaving, the weft yarns being visible in section.

In its portion 203 of greater thickness, the fiber structure 200 comprises 22 weft layers, specifically 44 weft half-layers t1 to t44. The first skin 2032 has the weft half-layers t1 to t10, the second skin 2033 has the weft half-layers t35 to t44, and the core has the weft half-layers t11 to t34. In the core 2031 situated between the opposite skins 2032 and 2033, the 3D weaving is of the Mock-Leno type (fabric ML). In the skins 2032 and 2033, the weaving is three-dimensional. In the skin 2032, the weft half-layers t1 and t2 are linked together by a weave of irregular satin type. In similar manner, in the skin 2033, the weft half-layers t43 and t44 are linked together by a weave of irregular satin type. A plurality of warp yarns C1, C2, C3, C16, C17, and C18 link together weft yarns 20 in the skins 2032 and 2033. The Mock-Leno fabric ML of the core 2031 is linked with the skins 2032 and 2033 by deflecting warp yarns from the skins into this fabric ML (see for example the yarns C3 and C16 in FIG. 3). The deflection of these warp yarns forms linking points PL linking the Mock-Leno fabric ML to the skins 2032 and 2033.

In its portion 204 of decreasing thickness, weft yarns are progressively withdrawn so as to reach a number of weft yarns that is compatible with the portion 205 that is to form the airfoil of the blade.

Figure 2:
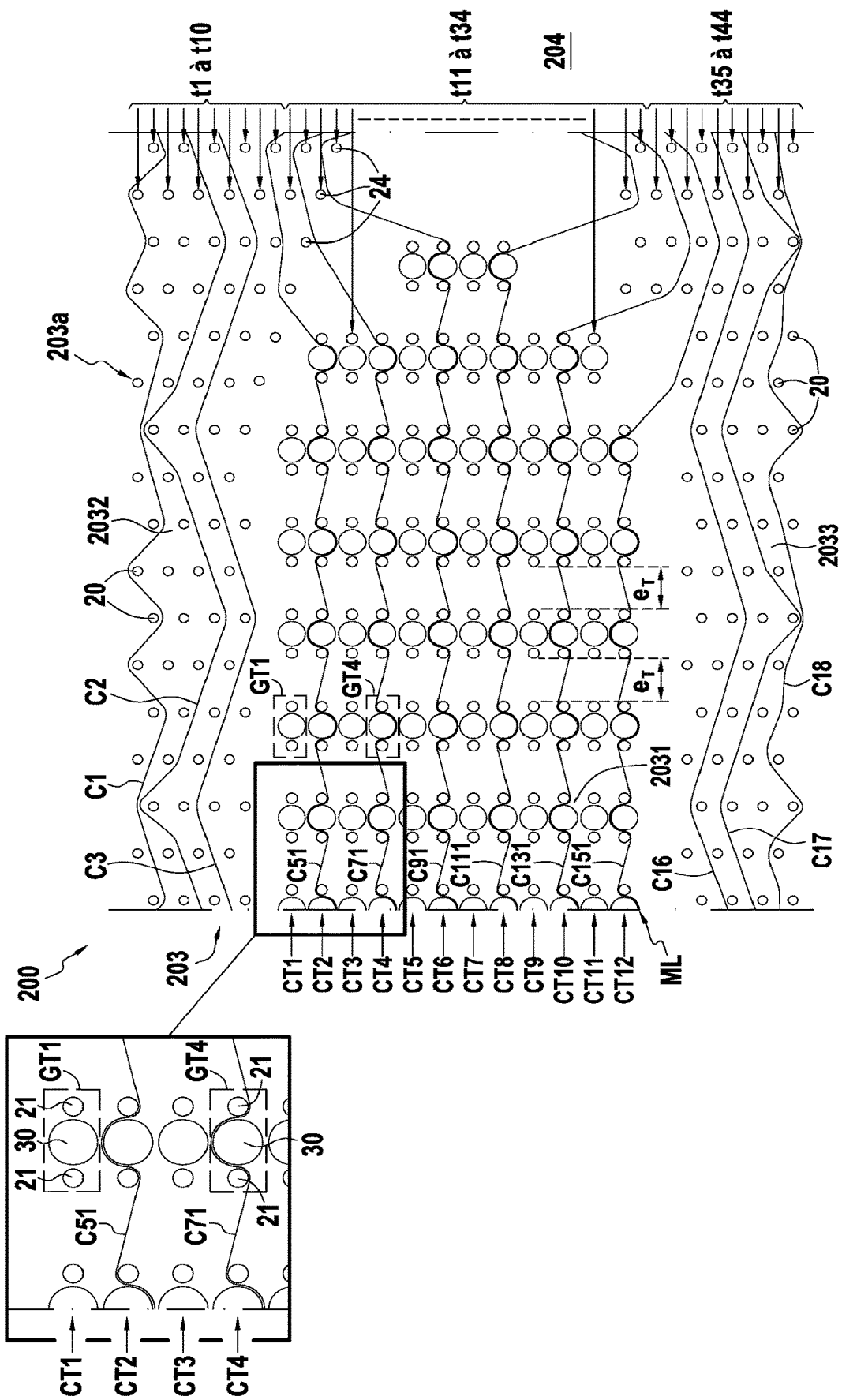
FIGS. 2 to 17 are weft section views on an enlarged scale showing in part sixteen successive planes of the weave of a portion of greater thickness in the FIG. 1 fiber structure.

The Mock-Leno fabric ML present in the core 2031 of the first portion 203 comprises a plurality of weft yarn layers CT1-CT12 (see FIG. 2 in particular). In the embodiment shown, the Mock-Leno fabric has twelve layers of weft yarns, but it would not go beyond the ambit of the invention if it were to have some other number of weft yarn layers. Warp yarns, such as for example C51, C71, C91, C111, C131, and C151 that are visible in FIG. 2, are interlinked with the weft yarns 21 and 30 in this fabric ML.

The Mock-Leno fabric ML also presents, in a direction perpendicular to the warp and weft directions, a thickness that decreases going towards the second portion 204. By progressively decreasing the thickness of this fabric ML, it is possible to control the fiber fraction in a zone 203a corresponding to the transition between the end of the portion 203 of greater thickness and the beginning of the portion 204 of decreasing thickness, i.e. the zone in which the thickness of the fiber structure begins to diminish. In the presently-described embodiment, the weft yarns of the Mock-Leno fabric ML are replaced progressively in the warp direction by weft yarns 24 having the same weight as the weft yarns 20 present in the portion 204 of decreasing thickness and in the skins 2032 and 2033 of the fiber structure.

In the Mock-Leno fabric ML, each layer of weft yarns CT1-CT12 also has a plurality of groups of weft yarns that are referenced in FIG. 2 as GT1 for the groups of weft yarns of the first layer CT1 of the fabric ML, and GT4 for the groups of weft yarns of the fourth layer of the fabric ML, for example.

The adjacent columns of weft yarns in the Mock-Leno fabric ML are spaced apart at a non-zero spacing $e_T$ along the warp direction. In particular, the adjacent groups of weft yarns in a single layer CTi, where i varies from 1 to 12 in the example shown, are spaced apart by the spacing $e_T$. The spacing $e_T$ may be substantially constant along the warp direction, as shown, or in a variant it may vary along this direction.

The Mock-Leno fabric ML is in the form of a grid having through channels along its thickness. As described in greater detail below, the presence of each of these through channels is the result of the non-zero spacing that exists firstly between the adjacent groups of weft yarns and secondly between the adjacent groups of warp yarns.

In the example shown in FIGS. 2 to 17, each of the groups of weft yarns comprise at least two lateral yarns 21 together with at least one central yarn 30 present between them. Each of the groups of weft yarns thus comprises at least three yarns. In the example shown, the central yarn 30 is a strand of diameter greater than the diameter of the two lateral yarns 21. The example shown relates to groups of weft yarns, each of which comprise three weft yarns. Nevertheless, it would not go beyond the ambit of the invention for each of the groups of weft yarns to comprise more than three weft yarns. In a variant, the strand 30 could be replaced by a braid or indeed by a plurality of central yarns arranged side by side and of diameter equal to or different from the diameter of the lateral yarns 21. Furthermore, and as described in detail below, the fabric ML in the example shown has a plurality of groups of warp yarns, each comprising eight warp yarns. It would not go beyond the ambit of the invention for the Mock-Leno fabric to have groups of warp yarns, each having some number of warp yarns that is other than eight. Thus, more generally, each of the groups of warp yarns may have at least three warp yarns. In addition, in the example shown, the number of warp yarns in each of the groups of warp yarns is different from the number of weft yarns in each of the groups of weft yarns, but it would not go beyond the ambit of the invention for these two numbers of yarns to be equal.

The interlinking of the warp yarns with the weft yarns is described below in greater detail with reference to the various different weft sections shown in FIGS. 2 to 17. In a given weft section, the warp yarns of the Mock-Leno weave fabric all have the same direction of interlinking with the weft yarns. Consequently, and for reasons of concision, the interlinking of a single warp yarn with the weft yarns is described below for each of the weave planes shown in FIGS. 2 to 17.

Figure 4:
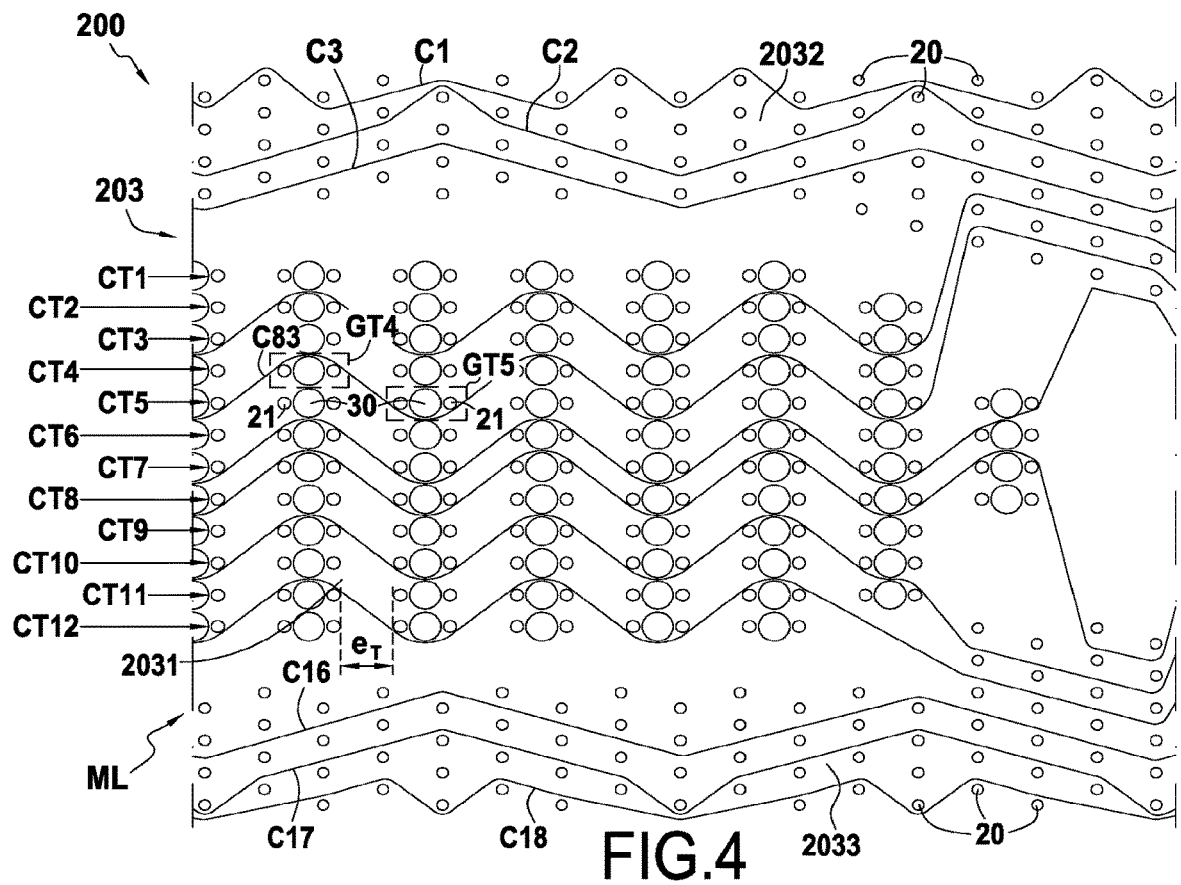

It can be seen in FIG. 4 that the inter-layer linking warp yarn C83 of the first group of warp yarns links the weft yarns of the layer CT4 of the Mock-Leno fabric together with the weft yarns of the layer CT5 of this fabric. More precisely, the warp yarn C83 passes in alternation over each of the yarns of a group of weft yarns GT4 of a first layer CT4 and under each of the yarns of a group of weft yarns GT5 of a second layer CT5. Specifically, the yarn C83 passes over each of the yarns of a first group GT4 of weft yarns of the first layer CT4, and then under each of the yarns of a second group GT5 of weft yarns of the second layer CT5, and then once more over each of the yarns of a third group GT4 of weft yarns of the first layer CT4, and so on.

Figure 6:
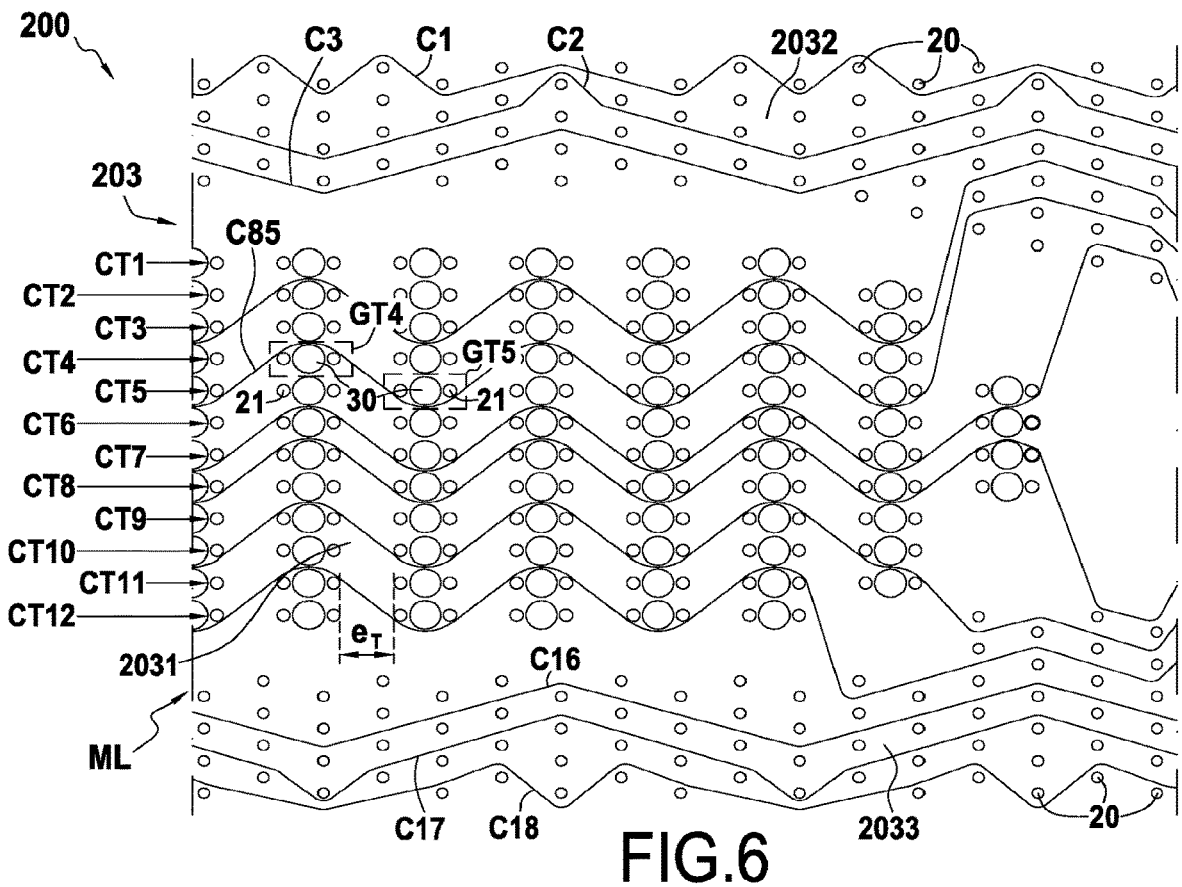

The above description for the inter-layer linking warp yarn C83 of the first group is applicable to the inter-layer warp yarn C85 of the first group (see FIG. 6).

Figure 5:
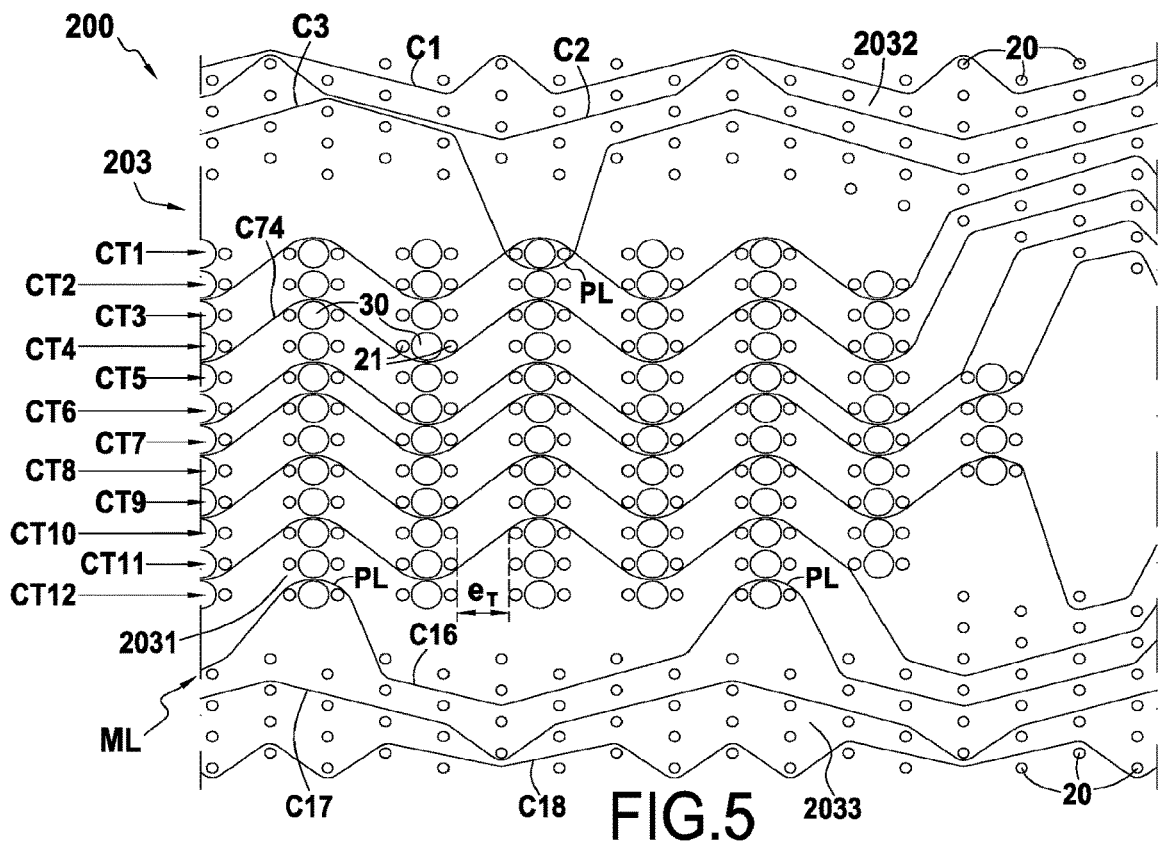
Figure 7:
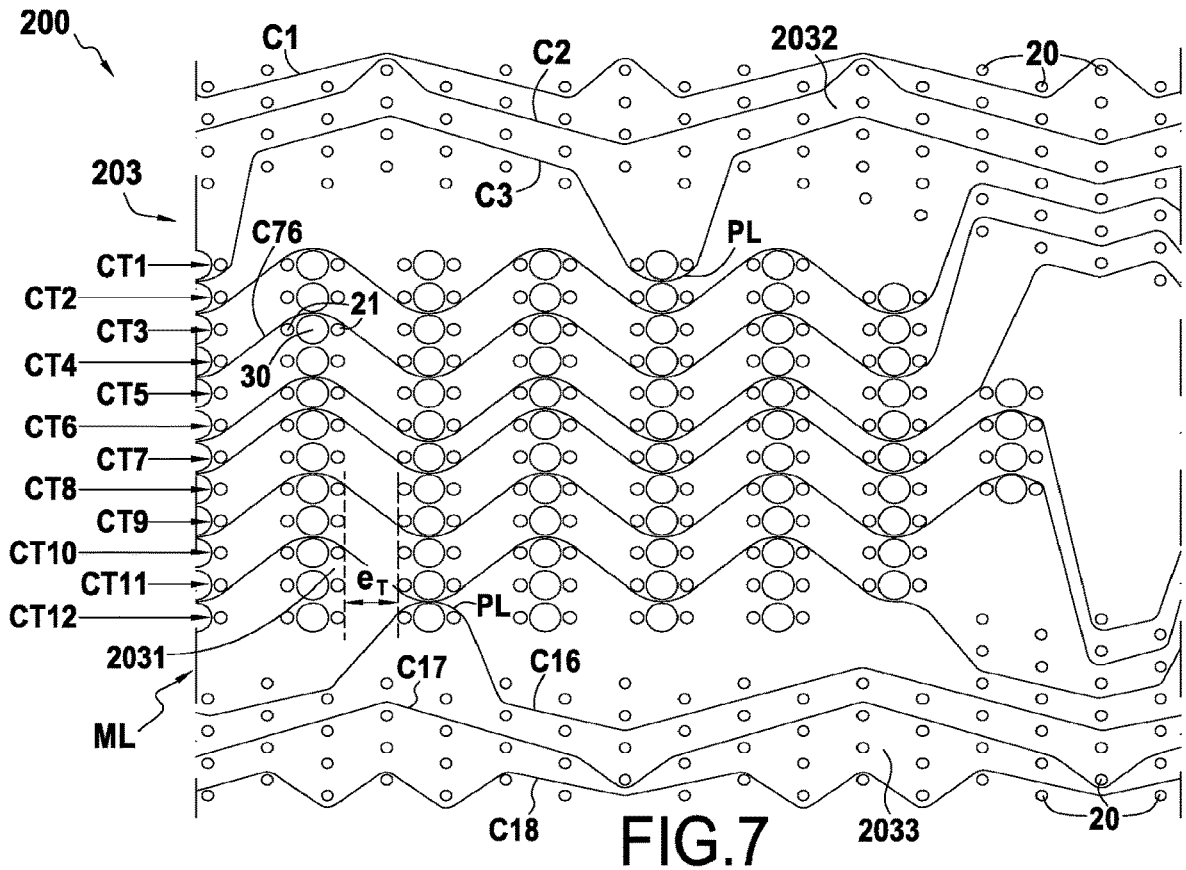

Similar remarks also apply to the linking warp yarns C74 and C76 of the first group of warp yarns each of which links together the weft yarns of the layer CT3 of the Mock-Leno fabric together with the weft yarns of the layer CT4 of this fabric (see FIGS. 5 and 7).

Figure 12:
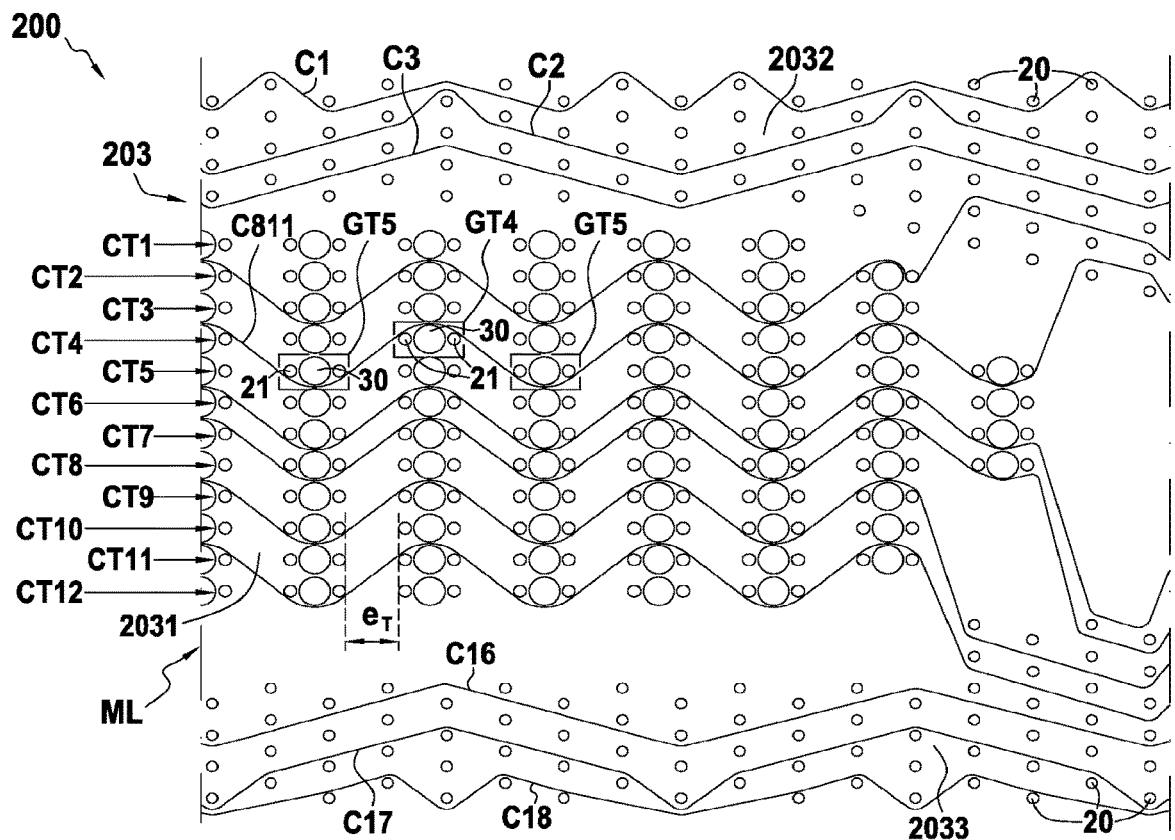

Relative to the second group of warp yarns, and with reference to FIG. 12, it can be seen that each inter-layer linking warp yarn C811 of the second group of warp yarns links the weft yarns of the layer CT4 of the Mock-Leno fabric together with the weft yarns of the layer CT5 of the same fabric. More precisely, the warp yarn C811 passes in alternation over each of the yarns of a group GT4 of weft yarns of the first layer CT4 and under each of the yarns of a group GT5 of weft yarns of the second layer CT5. Specifically, the yarn C811 passes over each of the yarns of a first group GT4 of weft yarns of the first layer CT4 and then under each of the yarns of a second group GT5 of weft yarns of the second layer CT5 and then once more over each of the yarns of a third group GT4 of weft yarns of the first layer CT4, and so on.

Figure 14:
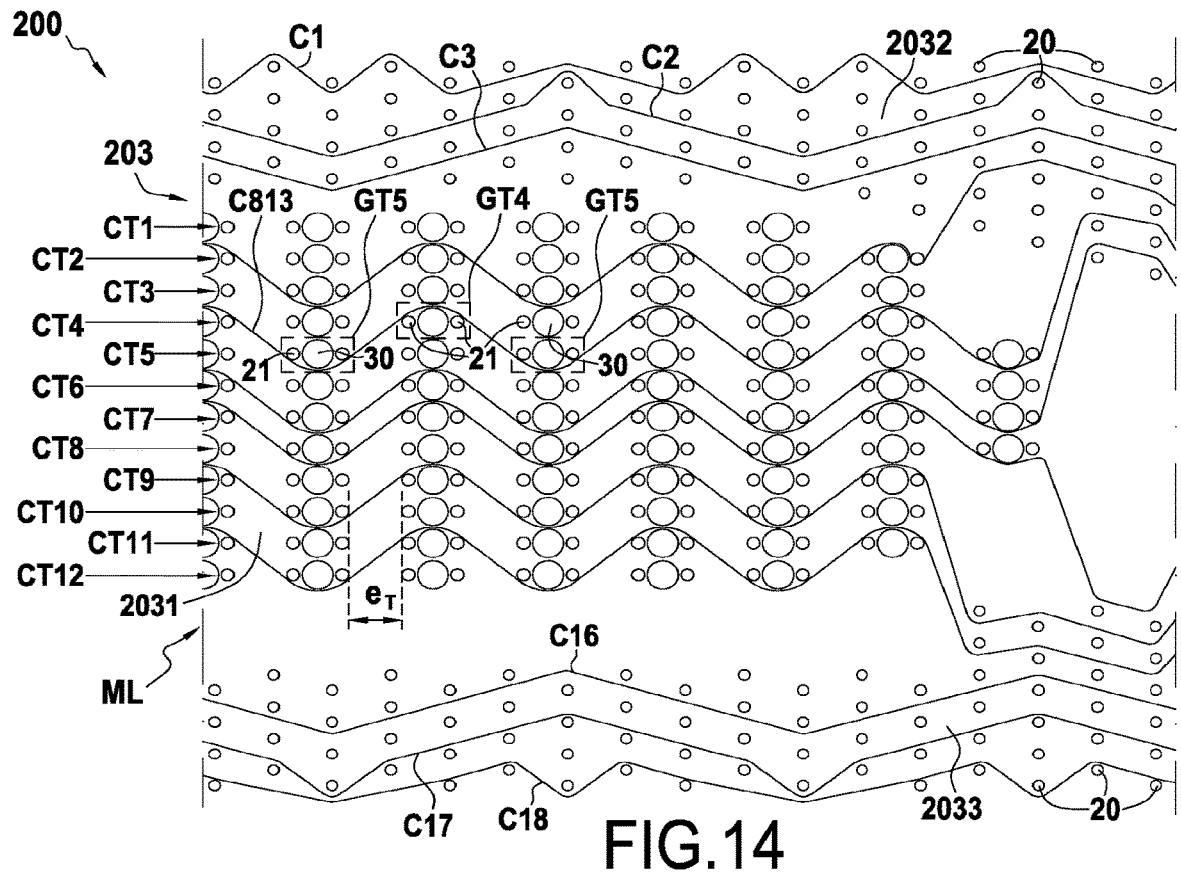

The above description for the inter-layer linking warp yarn C811 of the second group is applicable to the inter-layer linking warp yarn C813 of the second group (see FIG. 14).

Figure 13:
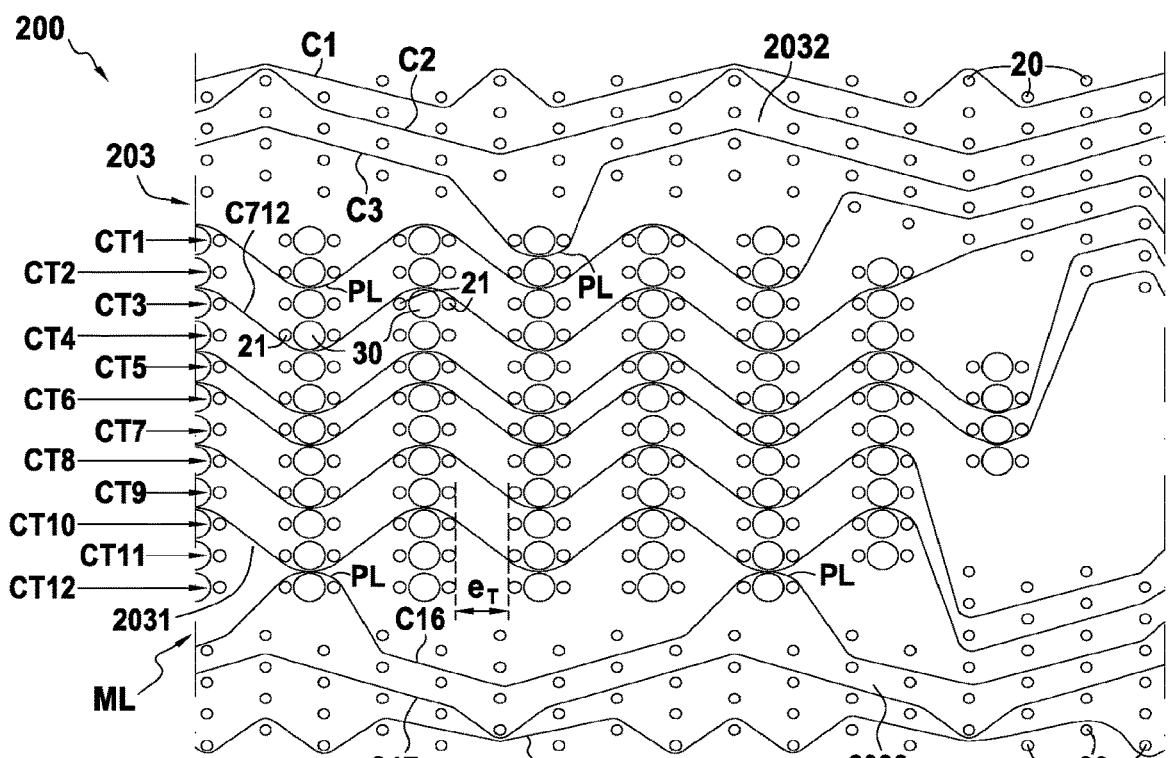
Figure 15:
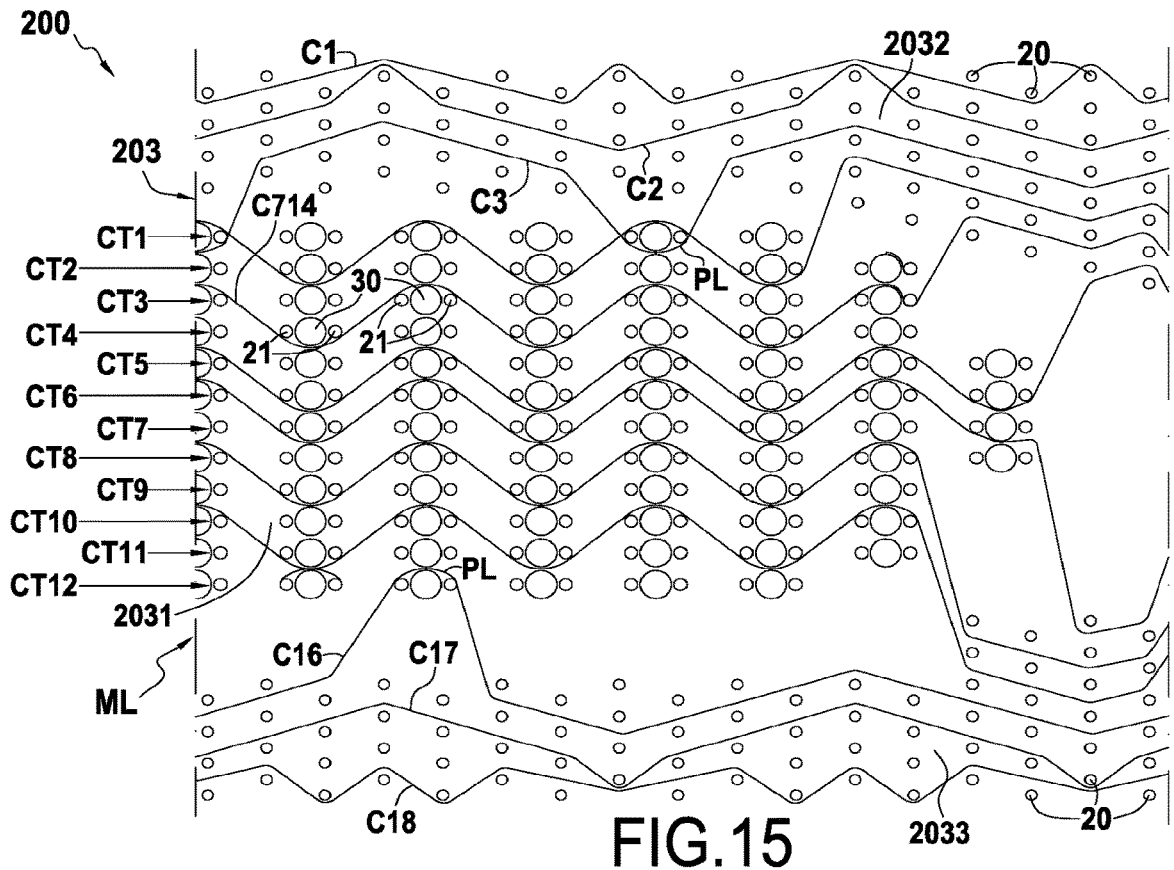

Similar remarks also apply to the linking warp yarns C712 and C714 of the second group of warp yarns that link each of the weft yarns of the layer CT3 of the Mock-Leno fabric with the weft yarns of the layer CT4 of this fabric (see FIGS. 13 and 15).

It should nevertheless be observed that the warp yarn C811 presents an interlinking direction with the weft yarns that is inverted relative to the interlinking direction presented by the warp yarn C85 with the weft yarn. In other words, for a given weft column, when the warp yarn C811 passes over each of the yarns of a group of weft yarns of the first layer CT4, the warp yarn C85 passes under each of the yarns of a group of weft yarns of the second layer CT5. In analogous manner, for a given weft column, when the warp yarn C811 passes under each of the yarns of a group of weft yarns of the second layer CT5, the warp yarn C85 passes over each of the yarns of a group of weft yarns of the first layer CT4. The linking yarn C83 of the first group also presents an interlinking direction with the weft yarns that is inverted relative to the interlinking direction presented by the linking yarn C813 with the weft yarns.

As mentioned above, this inverted interlinking direction between the inter-layer linking yarns of the first and second groups of warp yarns participates in obtaining non-zero spacing between the first and second groups of warp yarns, and thus to forming a fiber fabric that is in the form of a grid with pore channels presenting improved accessibility. It should also be observed that the fact that the linking yarns in a given group of warp yarns have the same direction of interlinking with the weft yarns makes it possible to allow the linking yarns of a given group of warp yarns to be brought closer together and thus also participate in forming pore channels (compact grouping of yarns in a given group).

It should also be observed that when going in the weft direction, the Mock-Leno fabric ML presents an alternation between first groups of warp yarns and second groups of warp yarns with inverted interlinking directions. In other words, when going in the weft direction, the Mock-Leno fabric ML presents in succession a first group of warp yarns and then a second group of warp yarns followed once more by a first group of warp yarns and then once more by a second group of warp yarns, and so on. Each of the first groups of warp yarns is adjacent to a second group of warp yarns.

Figure 8:
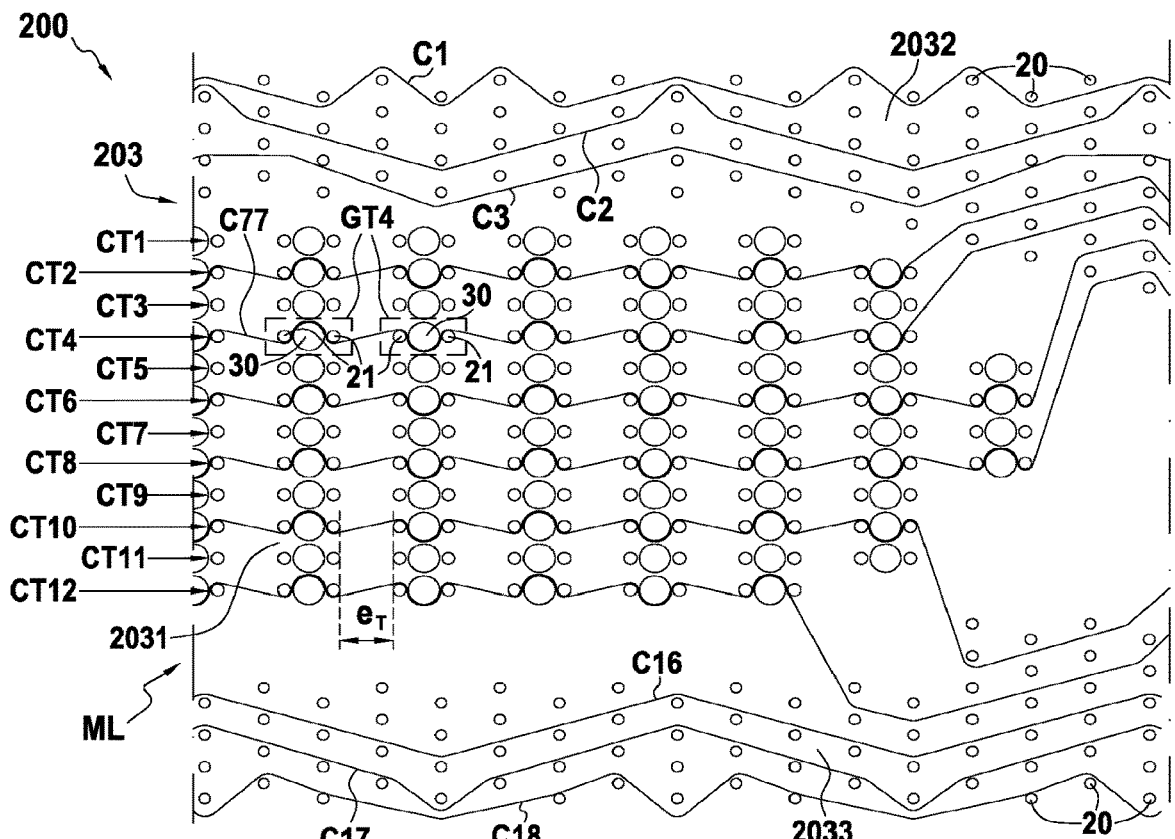

With reference to FIGS. 2 and 8, it can be seen that the first group of warp yarns also comprises at least one first lateral warp yarn C71 situated on a first side of the inter-layer linking yarn C83 together with at least one second lateral warp yarn C77 situated on a second side of the linking yarn C83, the second side being opposite from the first side in the weft direction. In other words, the inter-layer linking yarn C83 is present between the lateral warp yarns C71 and C77. More precisely, in the example shown, the inter-layer linking yarns C83 and C85 of the first group of warp yarns are both present between the lateral yarns C71 and C77 of the first group of warp yarns. Each of the lateral warp yarns C71 and C77 is interlinked with a plurality of groups GT4 of weft yarns of the first layer CT4.

The warp yarn C71 passes under a first lateral yarn 21 of a first group of weft yarns GT4, then over the central yarn 30 of this first group, and then under a second lateral yarn 21 of this first group. The warp yarn C71 then passes over a first lateral yarn 21 of a second group of weft yarns GT4 adjacent to the first group in the warp direction, and then under the central yarn 30 of this second group, and then over a second lateral yarn 21 of this second group, and so on. The warp yarn C71 passes in alternation under the lateral yarn 21 of a group GT4 of weft yarns and over the lateral yarns 21 of the group GT4 of weft yarns that is adjacent in the warp direction. The warp yarn C71 passes in alternation over a central yarn 30 of a group GT4 of weft yarns and under the central yarn 30 of the adjacent group GT4 of weft yarns in the warp direction.

Similar remarks apply to the second lateral warp yarn C77 that presents the same interlinking direction with the weft yarns as the first warp yarn C71 (see FIG. 8).

Figure 3:
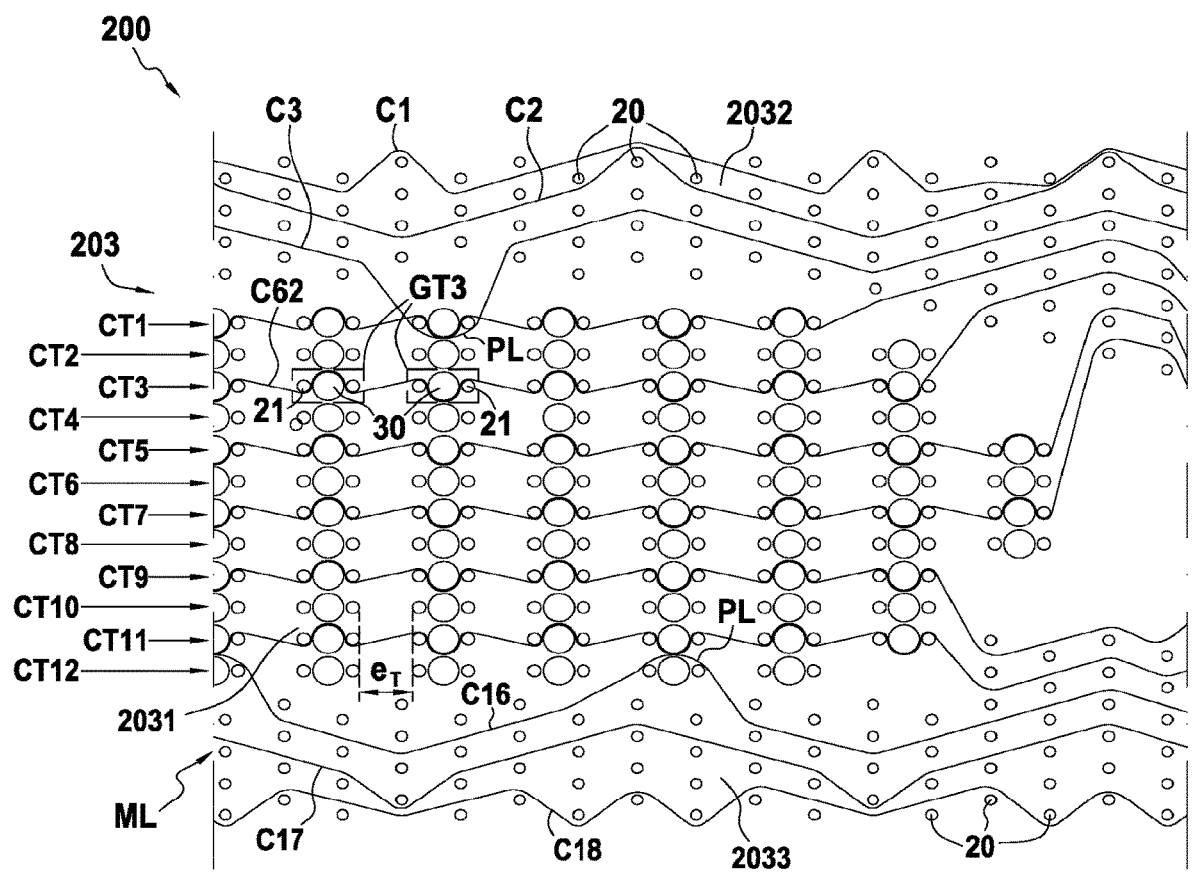
Figure 9:
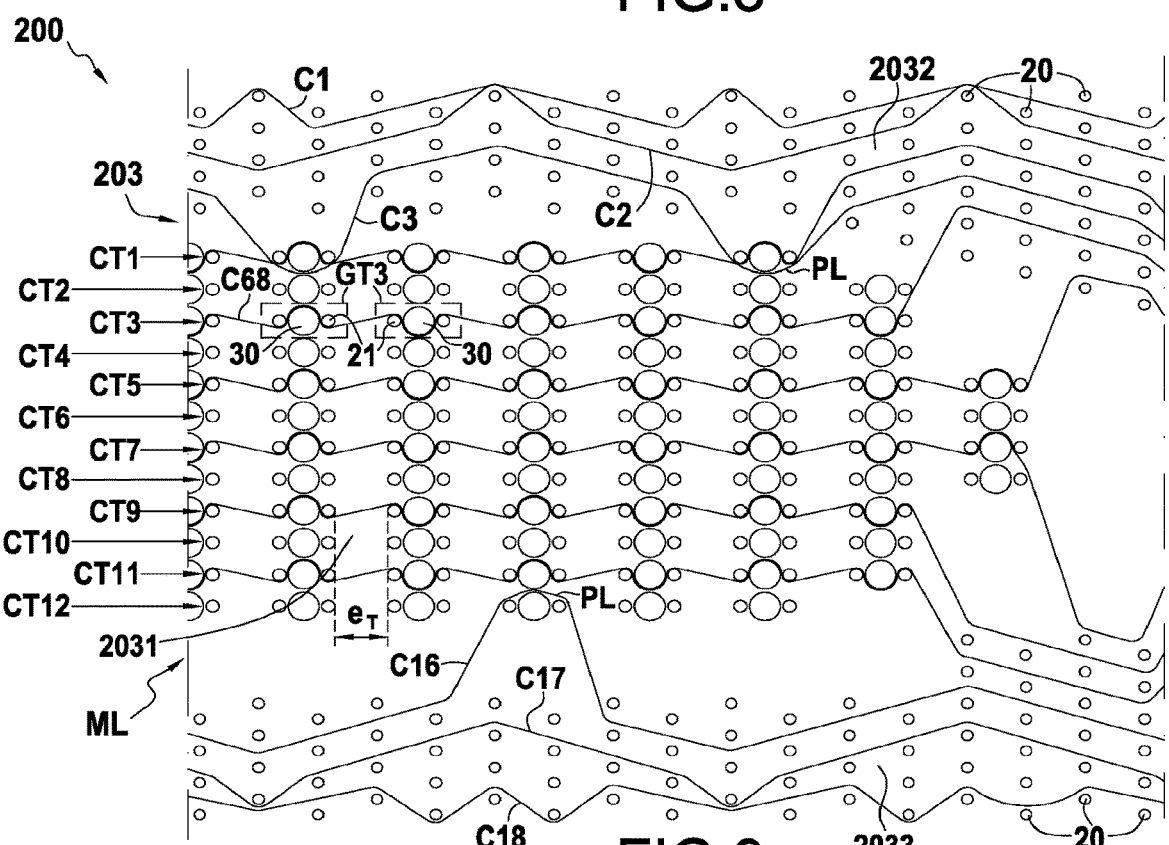

Similar remarks also apply to the lateral warp yarns C62 and C68 of the first group of warp yarns, each of which is interlinked with a plurality of groups GT3 of weft yarns in the third weft layer CT3 (see FIGS. 3 and 9).

In a variant that is not shown and in which the groups of weft yarns have two lateral weft yarns between which at least two central weft yarns are present, it is possible to have a warp yarn that passes under a first lateral yarn of a first group of weft yarns, then over each of the central yarns of the first group, and then under a second lateral yarn of this first group. This warp yarn can then pass over a first lateral yarn of a second group of weft yarns adjacent to the first group in the warp direction, and then under each of the central yarns of this second group, and then over a second lateral yarn of this second group, and so on. This is valid for the first and second groups of warp yarns present in the Mock-Leno fabric in such a variant.

Figure 10:
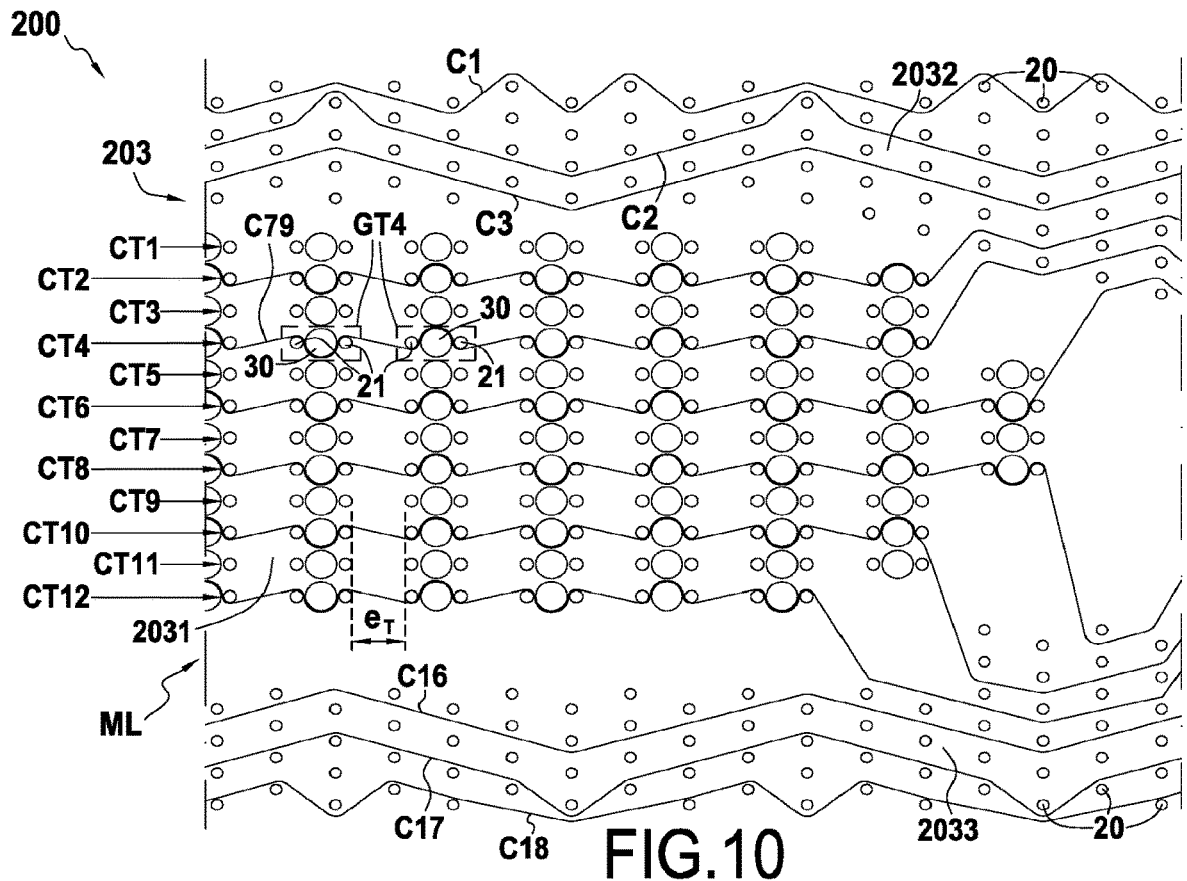
Figure 16:
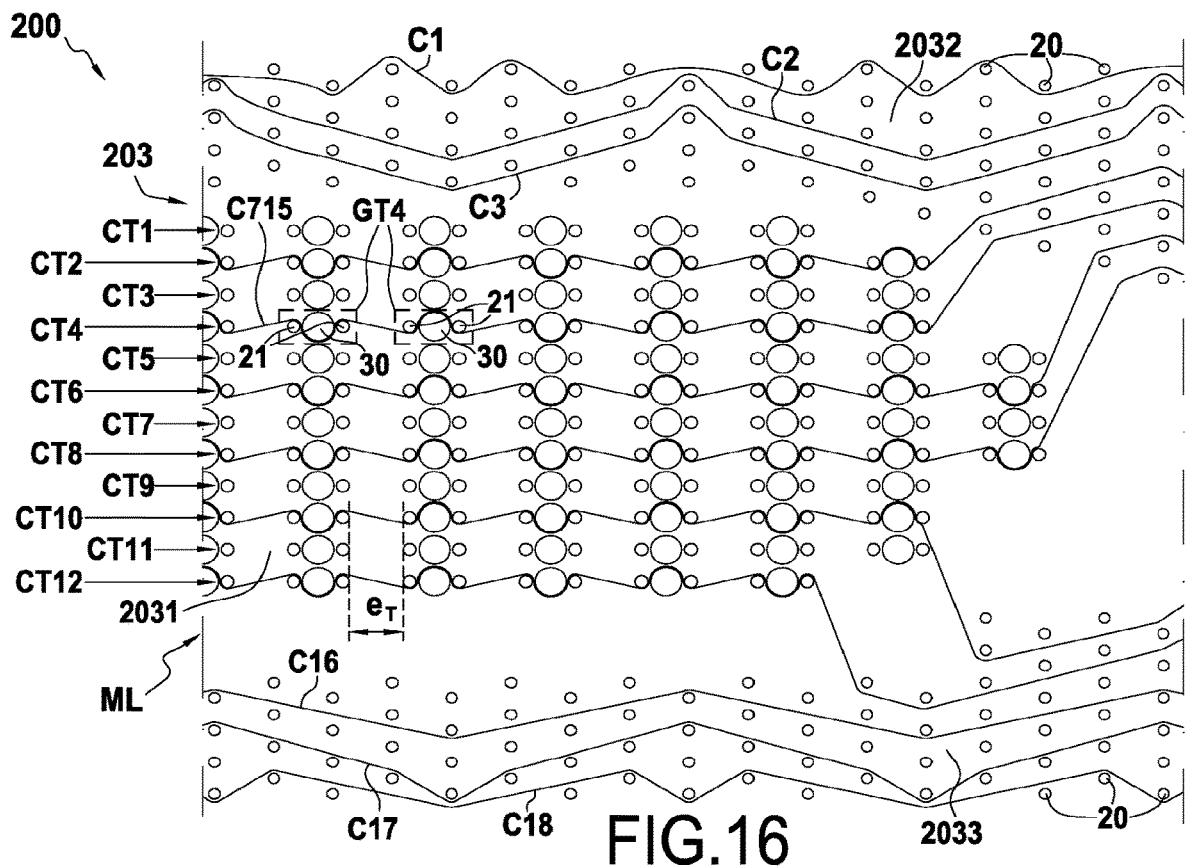

Concerning the second group of warp yarns, it can be seen with reference to FIGS. 10 and 16 that the second group of warp yarns also has at least one first lateral warp yarn C79 situated on a first side of the inter-layer linking yarns C811 together with at least one second lateral warp yarn C715 situated on a second side of the linking yarn C811, the second side being opposite from the first side in the weft direction. In other words, the inter-layer linking yarn C811 is present between the lateral warp yarns C79 and C715. More precisely, in the example shown, the inter-layer linking yarns C811 and C813 of the second group of warp yarns are both present between the lateral yarns C79 and C715 of the second group of warp yarns. Each of the lateral warp yarns C79 and C715 is interlinked with a plurality of groups of weft yarns of the first layer CT4.

The warp yarn C79 passes over a first lateral yarn 21 of a first group of weft yarns GT4, then under the central yarn 30 of this first group, and then over a second lateral yarn 21 of this first group. Thereafter, the warp yarn C79 passes under a first lateral yarn 21 of a second group of weft yarns GT4 adjacent to the first group in the warp direction, then over the central yarn 30 of this second group, and then under the second lateral yarn 21 of this second group, and so on. The warp yarn C79 passes in alternation over the lateral yarns 21 of a group GT4 of weft yarns and under the lateral yarns 21 of the group GT4 of weft yarns that is adjacent in the warp direction. The weft yarn C79 passes in alternation under the central yarn 30 of a group GT4 of weft yarns and over the central yarn 30 of the group GT4 of weft yarns that is adjacent in the warp direction.

The same remarks apply to the second lateral warp yarn C715 that presents the same interlinking direction with the weft yarns as the first warp yarn C79 (see FIG. 16).

Figure 11:
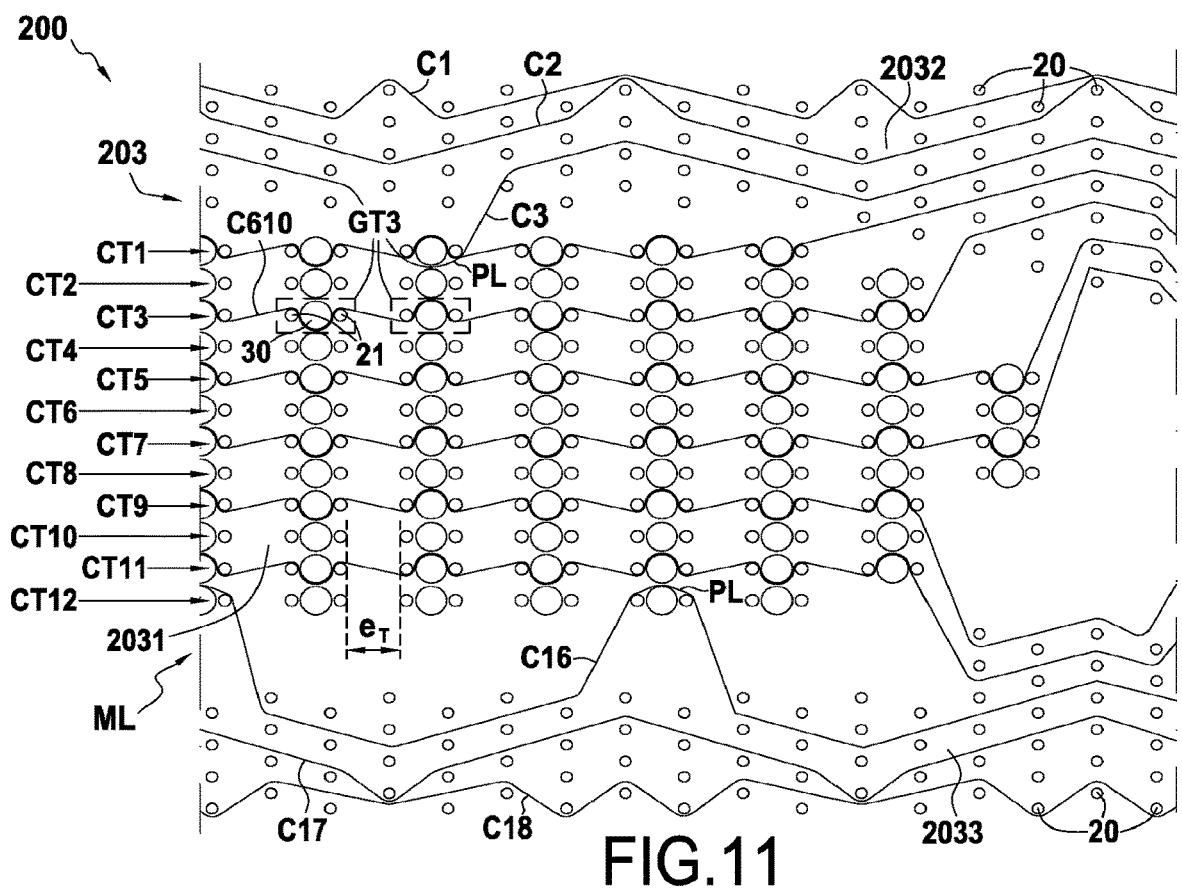
Figure 17:
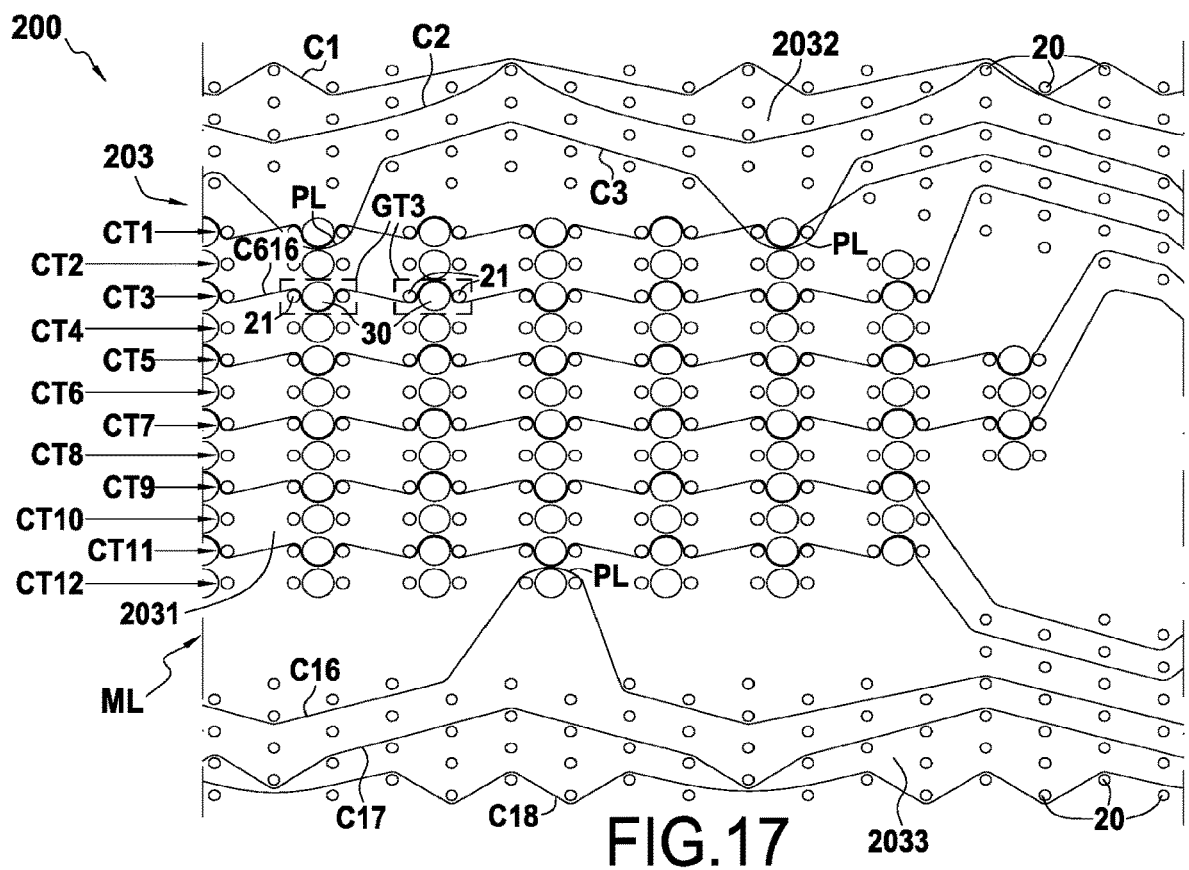

Similar remarks also apply to the lateral warp yarns C610 and C616 of the second group of warp yarns each of which interlinks with a plurality of groups GT3 of weft yarns of the third weft layer CT3 (see FIGS. 11 and 17).

It should nevertheless be observed that the warp yarn C79 presents an interlinking direction with the weft yarns that is inverted relative to the interlinking direction presented by the warp yarn C77 with the weft yarns. In other words, under such circumstances, when the warp yarn C79 passes over each of the lateral yarns 21 of a given group of weft yarns, the warp yarn C77 passes under each of the lateral yarns 21 of that group. In analogous manner, under such circumstances, when the warp yarn C79 passes under the central yarn 30 of a given group of weft yarns, the warp yarn C77 passes over the central yarn 30 of that group. The warp yarn C71 also presents an interlinking direction with the weft yarns that is inverted relative to the interlinking direction presented by the warp yarn C715 with the weft yarns.

As mentioned above, this inverted interlinking direction between the lateral yarns of the first and second groups of warp yarns contributes to obtaining non-zero spacing between the first and second groups of warp yarns and thus to forming a fiber fabric in the form of a grid in which the pore channels are particularly accessible. It should also be observed that the fact that the lateral yarns of a given group of warp yarns has the same interlinking direction with the weft yarns makes it possible to bring the lateral yarns of a given group of warp yarns closer together and thus also contributes to forming pore channels (compact grouping of yarns in a given group).

The use of a Mock-Leno fabric in the core of the first portion of the fiber structure makes it possible to increase considerably the thickness of the fiber structure while controlling the mean fiber fraction in the core, which is not true when making use only of yarns having greater weight in the core. Specifically, by using yarns having a high weight in the core of the structure, it is indeed possible to increase locally the thickness of the structure, but that leads to an increase in the mean fiber fraction in the core that is not compatible with the required mechanical properties. When the mean fiber fraction in the core is too great, it is not possible to have a pore network that is sufficient to enable the ingredients of the matrix to have good access to the core of the fiber structure. The quantity of matrix present in the core is then insufficient, which means that it is not possible to obtain a composite material part that presents the required mechanical properties in uniform manner. This problem is solved by using the Mock-Leno fabric which, because of the through channels formed in its thickness, makes it possible to increase locally the thickness of the structure while limiting the increase in the mean fiber fraction. A fiber structure is thus obtained that, while it is being densified, offers very good access for the ingredients of the matrix to the core of the structure in its portions of greater thickness.

Figure 20:
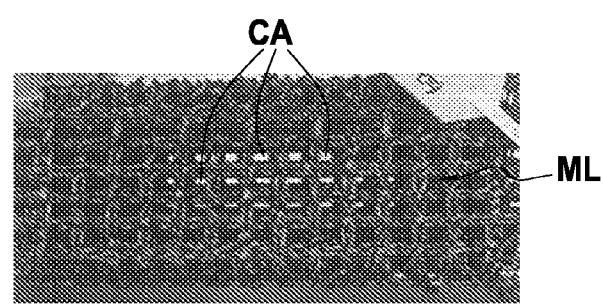
FIG. 20 is a photograph showing a fabric woven with the Mock-Leno weave.

By way of illustration, FIG. 20 shows an example of Mock-Leno fabric ML suitable for use in the core of the first portion of the fiber structure. It may be observed that through channels CA are present extending through the thickness of the fabric and giving it an openwork structure that is easily infiltrated by the matrix.

Particularly, but not exclusively, the fiber structure of the invention can be woven from yarns made of carbon fibers, of ceramic fibers, such as silicon carbide fibers, or of oxide fibers such as alumina fibers.

Figure 18:
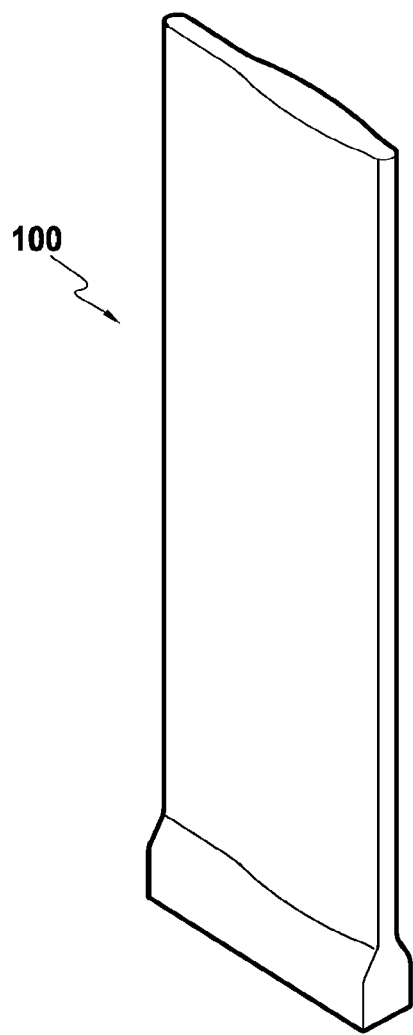
FIG. 18 is a diagrammatic perspective view of a blade fiber preform obtained from the FIG. 1 fiber structure.

Once the fiber structure 200 has been woven, the non-woven yarns are cut away. This produces the fiber preform 100 shown in FIG. 18, which is woven as a single piece.

Figure 19:
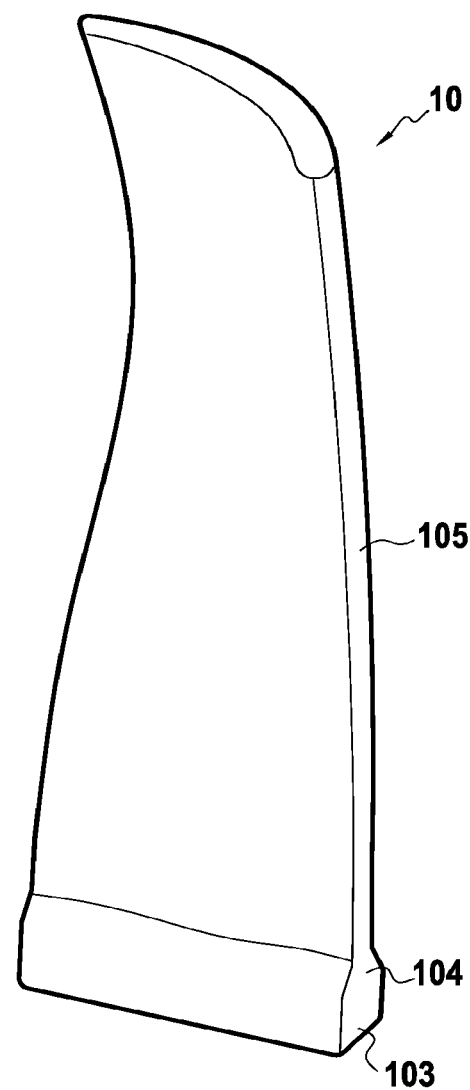
FIG. 19 is a diagrammatic perspective view of a composite material preform obtained by densifying the FIG. 18 preform with a matrix.

Thereafter, the fiber preform 100 is densified in order to form a blade 10 of composite material as shown in FIG. 19.

The fiber preform that is to form the fiber reinforcement of the part for fabricating is densified by causing the material that constitutes the matrix to fill in the pores of the preform, throughout all or part of its volume. This densification may be performed in known manner using the liquid consolidation method or the chemical vapor infiltration (CVI) method, or indeed by chaining both methods.

The liquid consolidation method consists in impregnating the preform with a liquid composition containing a precursor for the material of the matrix. The precursor is generally in the form of a polymer, such as a high performance epoxy resin, possibly diluted in a solvent. The preform is placed in a mold suitable for being closed in sealed manner and having a cavity with the shape of the molded final blade. Thereafter, the mold is closed and the matrix liquid precursor (e.g. A resin) is injected throughout the cavity in order to impregnate the entire fiber portion of the preform.

The precursor is transformed into matrix, i.e. it is polymerized, by performing heat treatment, generally by heating the mold, after eliminating any solvent and after curing the polymer, the preform being kept throughout in the mold having a shape that matches the shape of the part that is to be made.

When forming a carbon or ceramic matrix, the heat treatment consists in pyrolyzing the precursor in order to transform the matrix into a carbon or ceramic matrix depending on the precursor used and on pyrolysis conditions. By way of example, liquid precursors for ceramic, in particular SiC, may be polycarbosilane (PCS), or polytitano-carbosilane (PTCS), or polysilazane (PSZ) type resins, whereas liquid precursors of carbon may be resins having a relatively high coke content, such as phenolic resins. A plurality of consecutive cycles from impregnation through to heat treatment may be performed in order to reach a desired degree of densification.

In an aspect of the invention, in particular when forming an organic matrix, the fiber preform may be densified by the well-known resin transfer molding (RTM) method. In accordance with the RTM method, the fiber preform is placed in a mold having the outside shape of the part that is to be made. A thermosetting resin is injected into the inside space of the mold that contains the fiber preform. A pressure gradient is generally established in this inside space between the location where the resin is injected and orifices for evacuating the resin in order to control and optimize the impregnation of the preform by the resin.

The fiber preform may equally well be densified, in known manner, by the chemical vapor infiltration (CVI) method. The fiber preform corresponding to the fiber reinforcement of the blade that is to be made is placed in an oven into which a reaction gas phase is admitted. The pressure and the temperature existing in the oven and the composition of the gas phase are selected so as to enable the gas phase to diffuse within the pores of the preform in order to form the matrix therein by depositing a solid material in contact with the fibers of the core of the preform, which solid material is the result of decomposing an ingredient of the gas phase or of a reaction between a plurality of ingredients, as contrasted to the pressure and temperature conditions that are specific to chemical vapor deposition (CVD) methods that consist solely in depositing material on the surface of a substrate.

An SiC matrix may be formed using methyltricholosilane (MTS), giving SiC by decomposition of the MTS, while a carbon matrix may be obtained with hydrocarbon gases such as methane and/or propane that give carbon by cracking.

Densification combining a liquid technique and a gas technique can also be used to facilitate working, to limit costs, and to limit fabrication cycles, while obtaining characteristics that are satisfactory for the intended utilization.

It is also possible to use a melt infiltration method for forming the matrix in the pores of the fiber preform. In this type of method, the matrix is formed by infiltrating with silicon or an alloy of silicon in the molten state. Prior to infiltration, it is possible to introduce ceramic or carbon particles into the pores of the fiber preform. The ceramic particles may for example be particles of silicon carbide. When carbon particles are introduced, they react with the molten silicon that is introduced in order to form silicon carbide. The ceramic or carbon particles may be introduced by means of a slurry.

Starting with the fiber structure of the invention, the above-described densification method makes it possible to obtain mainly parts made out of organic matrix composite material (OMC), carbon matrix material (C/C), and ceramic matrix composite material (CMC).

When making a part out of oxide/oxide composite material, the fiber structure may be impregnated with a slurry carrying refractory oxide particles. After eliminating the liquid phase of the slurry, the resulting preform is subjected to heat treatment in order to sinter the particles and obtain a refractory oxide matrix. The structure may be impregnated by methods using a pressure gradient, as in the RTM type injection molding methods, or by sucking in a submicrometer powder.

After densification, a composite material blade 10 is obtained that, as shown in FIG. 19, has a root 103 in its bottom portion formed by the portion 203 of greater thickness of the fiber structure 200, which is extended by a tang 104 formed by the portion 204 of decreasing thickness in the structure 200, and an airfoil 105 formed by the portion 205 of the fiber structure 200.

The fiber structure and its method of fabrication in accordance with the present invention may be used in particular for making turbine engine blades that present a shape that is more complex than the shape of the blades shown in FIG. 19, such as blades that include, in addition to what is shown in FIG. 19, one or more platforms serving to perform functions such as sealing the gas flow passage, preventing tilting, etc.

The invention claimed is:

1. A method of fabricating a fiber structure by multilayer three-dimensional weaving between a plurality of weft yarns and of warp yarns, the fiber structure having at least first and second portions that are adjacent in the warp direction, the first portion presenting, in a direction perpendicular to the warp and weft directions, a thickness greater than the thickness of the second portion, the method comprising making the first portion by means of a step of three-dimensionally weaving warp and weft layers in which a fiber fabric is formed in the form of a Mock-Leno weave grid in a core of the first portion together with skins at a surface of the first portion, a weave of the skins being modified locally so as to deflect certain warp yarns from said skins and weave them with the fiber fabric in the form of the Mock-Leno weave grid.

2. The method according to claim 1, wherein the Mock-Leno weave fabric presents, in a direction perpendicular to the warp and weft directions, a thickness that decreases going towards the second portion.

3. The method according to claim 1, wherein the first and second portions have the same number of warp yarns woven continuously between the first and second portions, and wherein the first portion comprises in its core a number of warp yarn layers that is greater than the number of warp yarn layers present in the core of the second portion.

4. The method according to claim 3, wherein the first portion comprises in its core a number of warp yarn layers equal to twice the number of warp yarn layers present in the core of the second portion.

5. The method according to claim 1, wherein the fiber structure comprises carbon yarns or ceramic material yarns.

* * * * *